United States Patent [19]

Bonnier et al.

[11] Patent Number: 4,523,859

[45] Date of Patent: Jun. 18, 1985

[54] SEALED UNITARY THERMOMETRIC CALIBRATION CELL CONNECTING DIFFERENT FIXED POINTS

[75] Inventors: Georges Bonnier, Montsoult; Yves Hermier, Paris, both of France

[73] Assignee: Centre National de la Recherche Scientifique, Paris, France

[21] Appl. No.: 473,247

[22] Filed: Mar. 8, 1983

[30] Foreign Application Priority Data

Mar. 9, 1982 [FR] France .................. 82 03951

[51] Int. Cl.³ .................. G01K 15/00; G01K 1/16
[52] U.S. Cl. .................. 374/1; 374/165; 374/208
[58] Field of Search .................. 374/1, 208, 183, 187, 374/16, 165; 165/104.14, 104.21

[56] References Cited

U.S. PATENT DOCUMENTS

| 854,278 | 5/1907 | Darlington | 165/104.14 |
|---|---|---|---|
| 1,786,285 | 12/1930 | Bissell | 165/104.14 X |
| 3,018,087 | 1/1962 | Steele | 165/133 X |
| 3,472,314 | 10/1969 | Balch | 165/67 X |
| 3,557,565 | 1/1971 | Kissel | 374/1 X |
| 4,011,552 | 3/1977 | Quirke | 374/1 X |
| 4,324,375 | 4/1982 | O'Neill | 165/104.14 X |

Primary Examiner—Daniel M. Yasich
Attorney, Agent, or Firm—Cushman, Darby & Cushman

[57] ABSTRACT

The thermometric cell for cryogenic calibration includes several superimposed annular chambers fitted around a massive metal body part. Each cell includes a partition floor acting as a heat exchanger and provided with concentric grooves. Into each chamber is introduced a measured quantity of a substance to fill the grooves and having a first sort characteristic phase transition temperature. The invention especially applies to calibrating thermometers.

7 Claims, 3 Drawing Figures

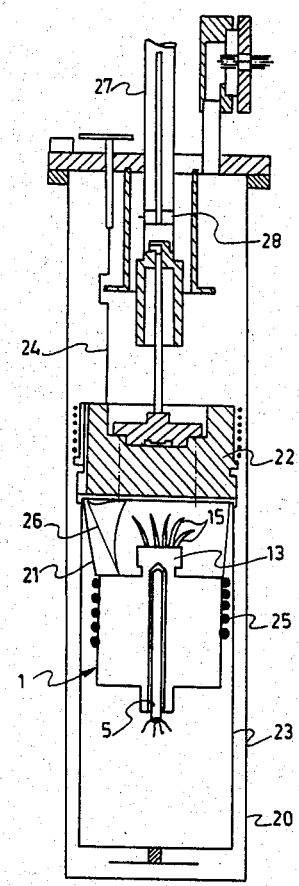
Fig: 3

SEALED UNITARY THERMOMETRIC CALIBRATION CELL CONNECTING DIFFERENT FIXED POINTS

BACKGROUND OF THE INVENTION

The present invention generally relates to thermometric cells adapted to calibrate thermometers and, more specially, a sealed thermometric cell including multichambers which connect various fixed points.

The development, in 1975, by a team to which the present inventors belong, of the first sealed cell using the triple point of argon as a transfer reference has allowed to greatly improve, both as far as the accuracy and process easiness are concerned, cryogenic calibrations.

Calibrating within wider ranges, however, requires using further references, typically characteristic phase transitions, with a view to limiting interpolations or extrapolations when calibrating thermometers. Now, as it is known, filling a cell with a high purity substance having such characteristic phase transition is an extremely delicate and meticulous work. Furthermore, using several sealed cells, each including one of the standard substances thereof, can hardly be contemplated because of implementing difficulties and as controlling cryostats is critical and the volume they provide has a low value.

Therefore, there is a need for a thermometric cell capable of connecting different fixed points, and thus allowing to calibrate a thermometer for said different fixed points without having to dismantle either the equipement nor the thermometer when carrying out successive calibrations.

Now, to this end, several parameters should be taken into account. Geometry of individual cells should be determined, not only in order to obtain a miniaturized cell, but also to optimize the individual cell envelope capacity and the response time thereof. Also, due to the extreme accuracy required by such calibrations, cell cleaning problems (in order to avoid, specially, contaminating the pure calibration substance with the cell material) should lead to a trade-off between good heat exchange characteristics and said cleaning capability (one should remember here that a 10 ppm impurity rate is already on the high side).

SUMMARY OF THE INVENTION

The present invention provides a sealed thermometric cell capable of connecting different fixed points within a confined space, with optimized response time or balance return for each characteristic temperature.

To this end, according to a feature of the present invention, a sealed unitary thermometric cell is provided including at least two hermetrically sealed chambers which are separate but thermically connected.

According to another feature of the invention, said cell includes a metal body part defining at least on elongated housing to receive a thermometer and insuring thermal-linking between chambers, the latter having an annular configuration and being coaxially arranged with reference to the cell metal body part axis.

One way of carrying out the invention is described in detail below with reference to the drawings, which illustrate one specific embodiment, in which:

DESCRIPTION OF THE DRAWINGS

FIG. 3 is a longitudinal section diagrammatic view showing an adiabatic cryostat using a sealed cell according to the invention.

DESCRIPTION OF THE PREFERRED EMBODIMENT

Figure 1:
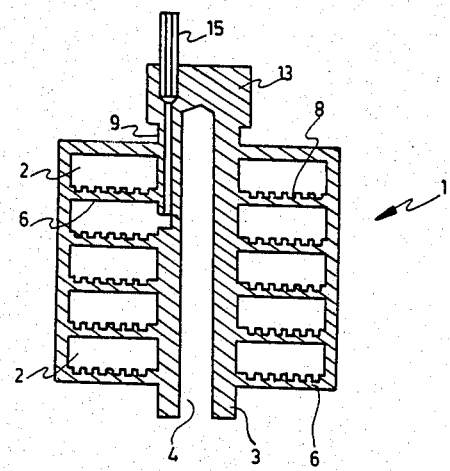
FIG. 1 is a longitudinal section diagrammatic view of a sealed unitary thermometric cell having five chambers according to the invention.

In the description and in the various figures, the same parts are given the same designations. The following description essentially refers to a sealed thermometric cell connecting five fixed points for cryogenic calibrations, wherein said chambers include, in addition to water, four gases thus supplying triple points in the range from 273° K to 23° K. However, sealed thermometric cells according to the present invention can be used for calibrations within other temperature ranges by implementing different substances having characteristic liquid phase transition temperatures, i.e. first sort transition, within said temperature ranges. So, by way of a non limiting example, instead of cryogenic gases, gallium of indium may be used in the chambers, the melting points of which are 303° K. and 423° K. respectively, for calibrating thermometers for medical or veterinary applications.

In the embodiment illustrated in the figures, the sealed thermometric cell, indicated generally by the reference 1, includes an assembly comprising substantially similar individual cells, each defining an hermetically sealed chamber 2. Chambers 2 have an annular or toric configuration having a square section, and surround a massive tubular center cup shaped body part 3 in which is provided a longitudinal bore 4 to receive a thermometer 5 (FIG. 3). Each chamber includes a floor 6 shaped as a diphasic heat exchanger. That is, in floor 6 there are formed concentric grooves 7, which are spaced apart by ribs 8 having radial passages angularly offset and distributed so as to allow good speading of the melt substance before it solidifies in said different grooves 7. In the embodiment illustrated, each chamber is about 7 mm high and about 16 mm wide. Angularly distributed filling channels 9 are formed in the center body part 3 and open respectively into said different individual chambers 2.

Figure 2:
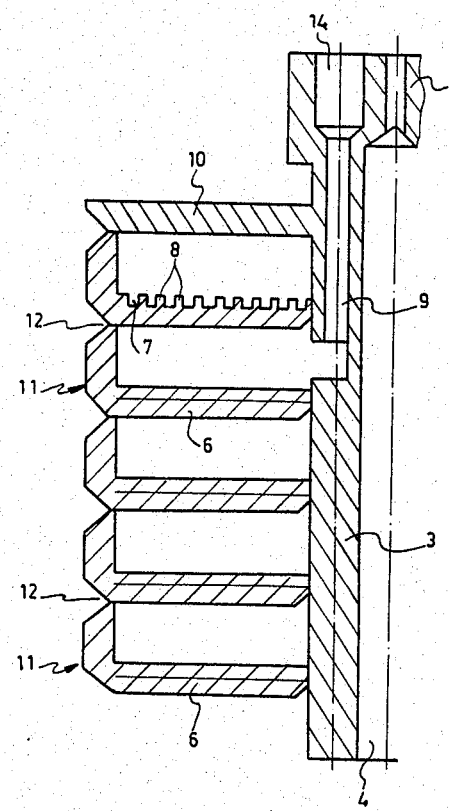
FIG. 2 is an enlarged longitudinal half-section view showing an embodiment of the cell illustrated in FIG. 1.

In practice, as shown in FIG. 2, the cell assembly 1 is obtained by machining stainless steel blocks (as sintered stainless steel does not have the required properties for maintaining substance purity in chambers 2). The body part 3 thus includes an upper wall 10 acting as a top wall of the higher cell, said different chambers being formed by cups 11, which are fitted on body part 3 acting as a hub for the whole cell and being soldered on part 3 and between them, with peripheric V-shaped grooves 12 being used for peripheric solder beads between adjacent cups. Consequently, said different chambers are all thermically connected. Channels 9 each open into enlarged tip end 13 of body part 3 through bigger diameter bore 14 adapted to receive filling copper tube 15 which eventually will be flattened out and brazed once the corresponding chamber 2 is filled.

With such an arrangement, response time of each cell or individual chamber is inversely proportionnal to the internal developed surface thereof. Each chamber has, in the embodiment illustrated, an internal volume of 9.18 cm$^3$ and an internal developed surface of 24 cm$^2$. Space defined in cell floor by grooves 7 has a volume of 0.86 cm$^3$. Experiments carried out by the present inventors showed that, according to specially designed mathematical models, each individual cell chamber 1 behaves similarly to a cell only including one of said chambers, thereby obtaining, according to the object of the invention, with such a cell various fixed points by filling chambers with ddifferent characteristic substances. So, when a cell is adapted for cryogenic calibrations, said different chambers include respectively water, argon, nitrogen, oxygen and neon, the triple point temperatures of which are 173° K., 83° K., 63° K., 54° K. and 23° K. At such temperatures, the cell thermal capacities are 130j/° K., 75j/° K., 55j° K., 45j/° K., and 8j/° K. respectively.

The filling procedure of each chamber is as follows. When a chemical cleaning step is completed, the chamber and the filling system thereof are rinsed with pure gas. Between two rinsing the steps, chamber is emptied by using a mechanical pump and a turbo-molecular pump. The pure gas is then introduced into chamber via supply copper tube 15 and channel 9, under the required pressure, in order to obtain, at low temperature, a liquid or solid film, taking up the major part of grooves 7, possibly very slightly over-flowing from the latter. Supply tube 15 is then closed and shut off. The same applies to said different chambers. As an alternative, instead of only having one center well 4 adapted for one thermometer, a stainless steel cylinder can be provided around chambers 2, in which are formed several angularly spaced wells in order to simultaneously calibrate several thermometers.

Calibrating said thermometer 5 is carried out in a cryostat of the type illustrated in FIG. 3. Said cryostat includes a vacuum container 20, which will be placed in an adequate environment for cryogeny (Dewar flask, successively containing liquid or solid nitrogen and liquid helium in order to reach the different triple points of various substances in said different chambers). Cell 1 is hung by nylon wires 21 to heating body 22 which is connected to an external supply and control system (not shown). Cell 1 is surrounded by radiation absorbing screen 23 made of golden copper, which is thermically connected to environment by silver wire 24. Heating coils 25 are also provided around cell 1. Heating cryostat inner part is controlled around characteristic point by differential thermocouple 26, thereby temperature difference between screen 23 and cell 1 is eliminated. Cryostat evacuating tube 27 is provided with radiation absorber 28. After calibration up to the selected triple point temperature, cell thermal shift is corrected by a connected microprocessor monitor (not shown), at the expense of an extremely low electric consumption.

While the above description constitutes the preferred embodiment of the invention, it will be appreciated that the invention is susceptible to modification, variation and change without departing from the proper scope or fair meaning of the accompanying claims.

Having thus described the invention, we claim:

1. A sealed thermometric cell for calibrating thermometers comprising:
   means for defining a unitary assembly of at least two hermetically sealed chambers, each containing a substance having a characteristic phase transition temperature different from that of the substance contained in the other chamber;
   said chambers being separated by a partition wall having high heat conductivity, and
   said means including an integral massive metal part forming at least a portion of said partition wall of each of said chambers to further insure high heat transfer between said chambers, said part defining a housing for the reception of a thermometer to be calibrated.

2. The cell of claim 1 wherein the body part is tubular and the chambers are of annular configuration and coaxially arranged with respect to said part.

3. The cell of claim 2 wherein the chambers are superimposed.

4. The cell of claim 2 wherein the chamber defining means includes a cup shaped part having an opening in its bottom wall through which the body part extends.

5. The cell of claim 2 wherein the body part includes separate longitudinal channels for introducing the corresponding substance into each chamber, one end of each channel opening to one end of said body part and the other end of each channel opening into the corresponding chamber.

6. The cell of claim 1 wherein the partition wall has a surface configured for good heat exchange.

7. The cell of claim 6 wherein the partition wall is provided with a plurality of concentric grooves to be filled with the substance.

* * * * *